Nov. 10, 1953  P. ORR ET AL  2,658,413
TRANSMISSION
Filed Dec. 22, 1947  7 Sheets-Sheet 1
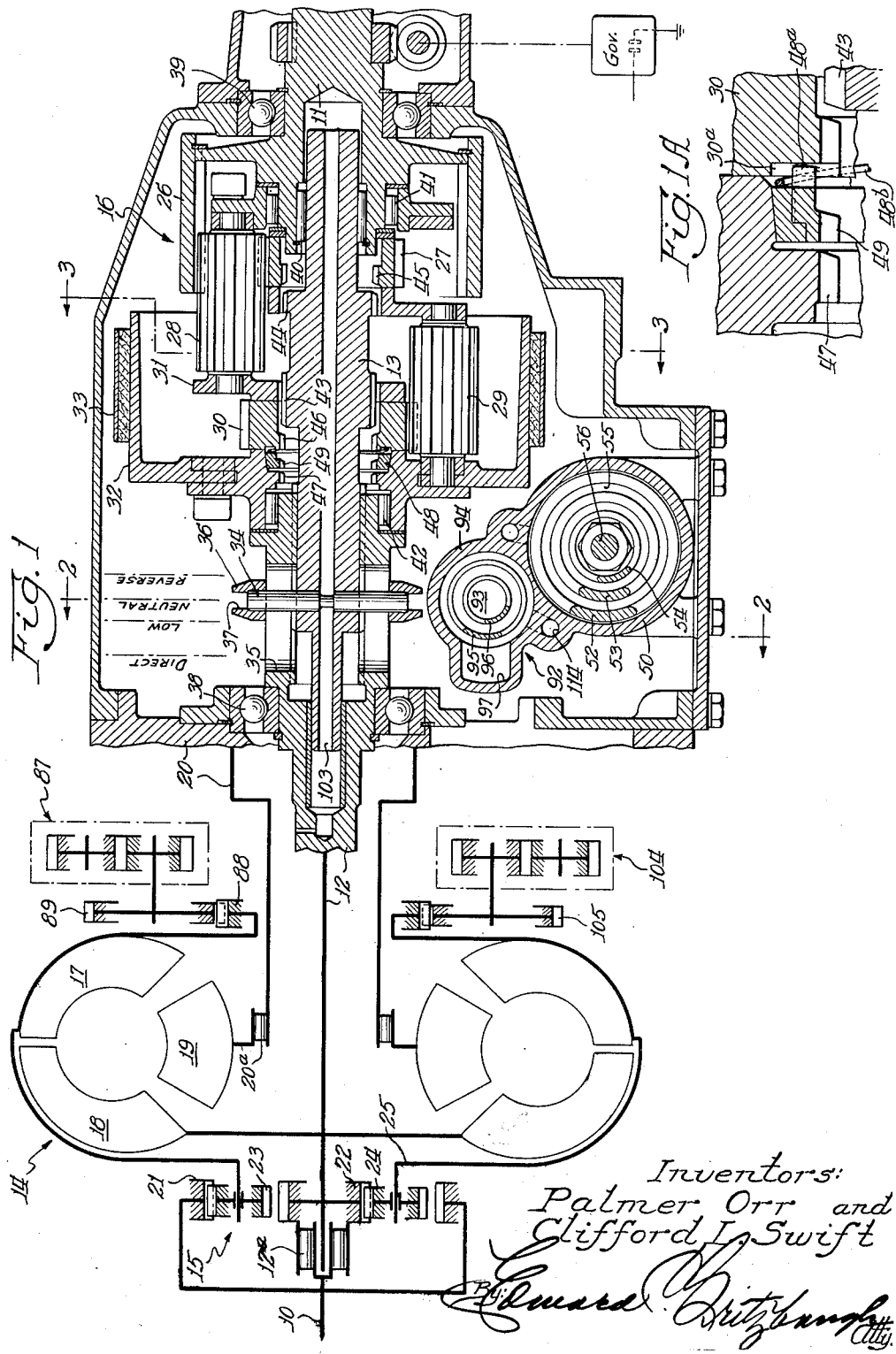
Inventors:
Palmer Orr and
Clifford L. Swift

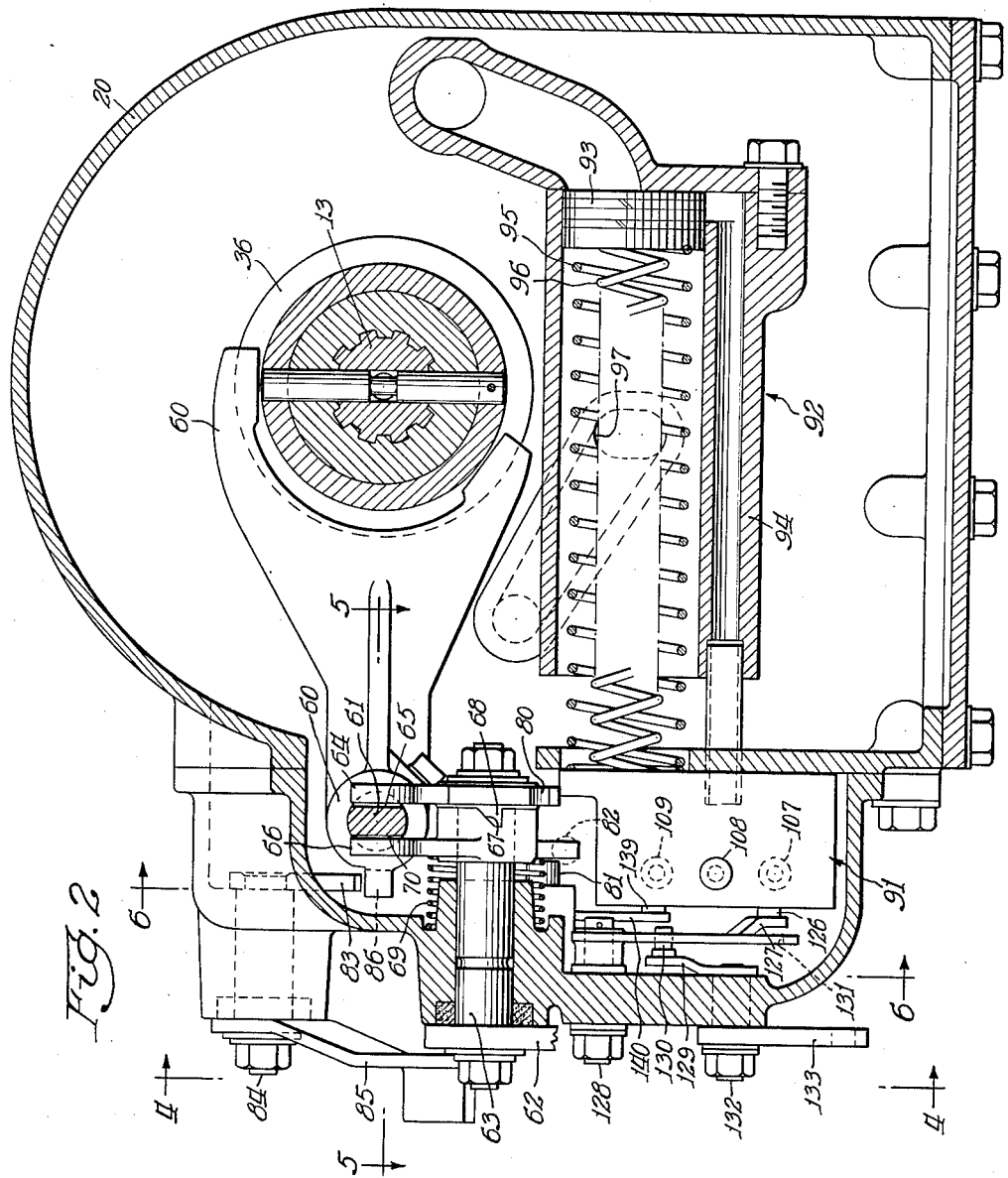

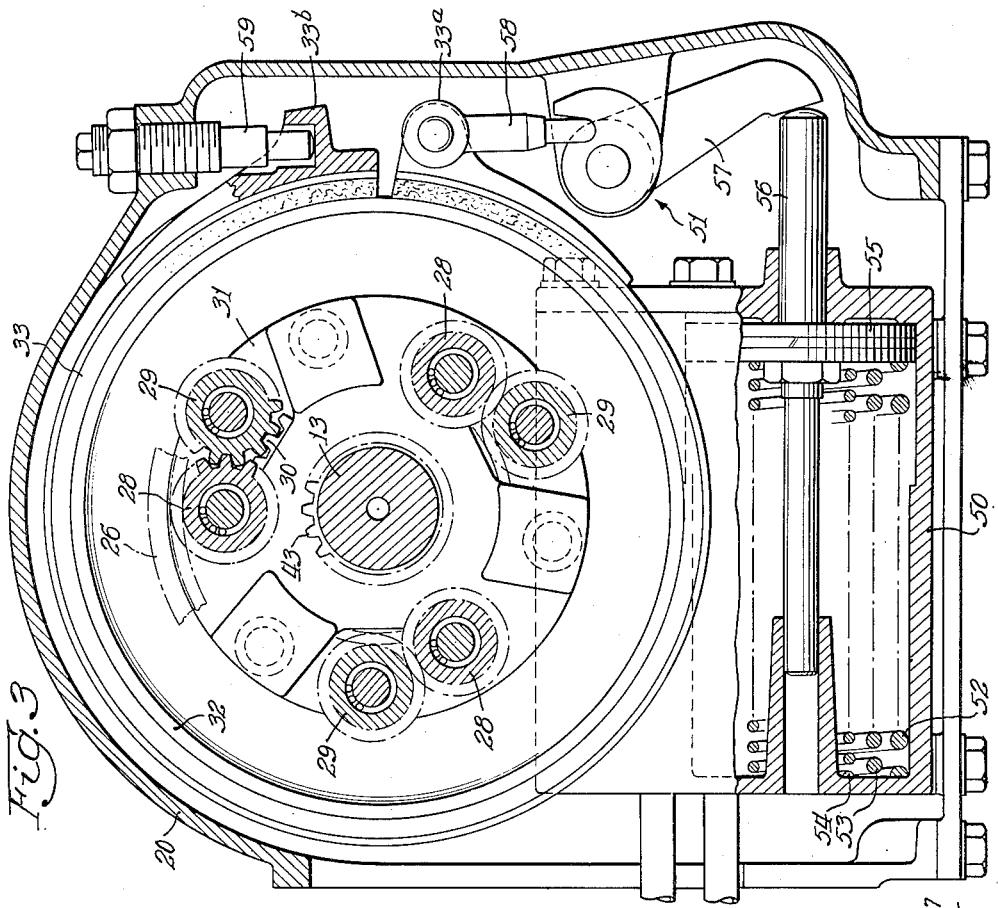
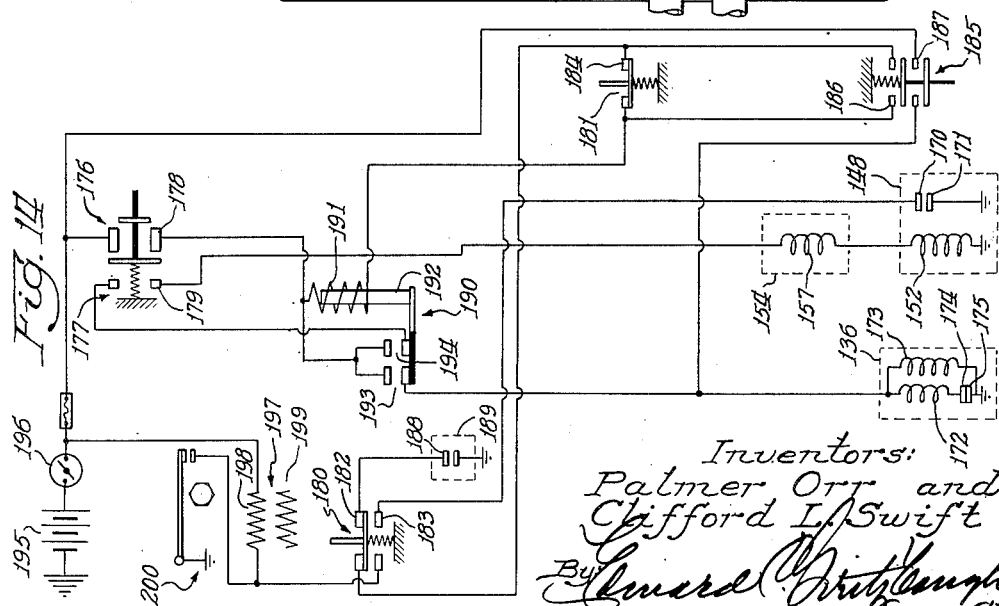

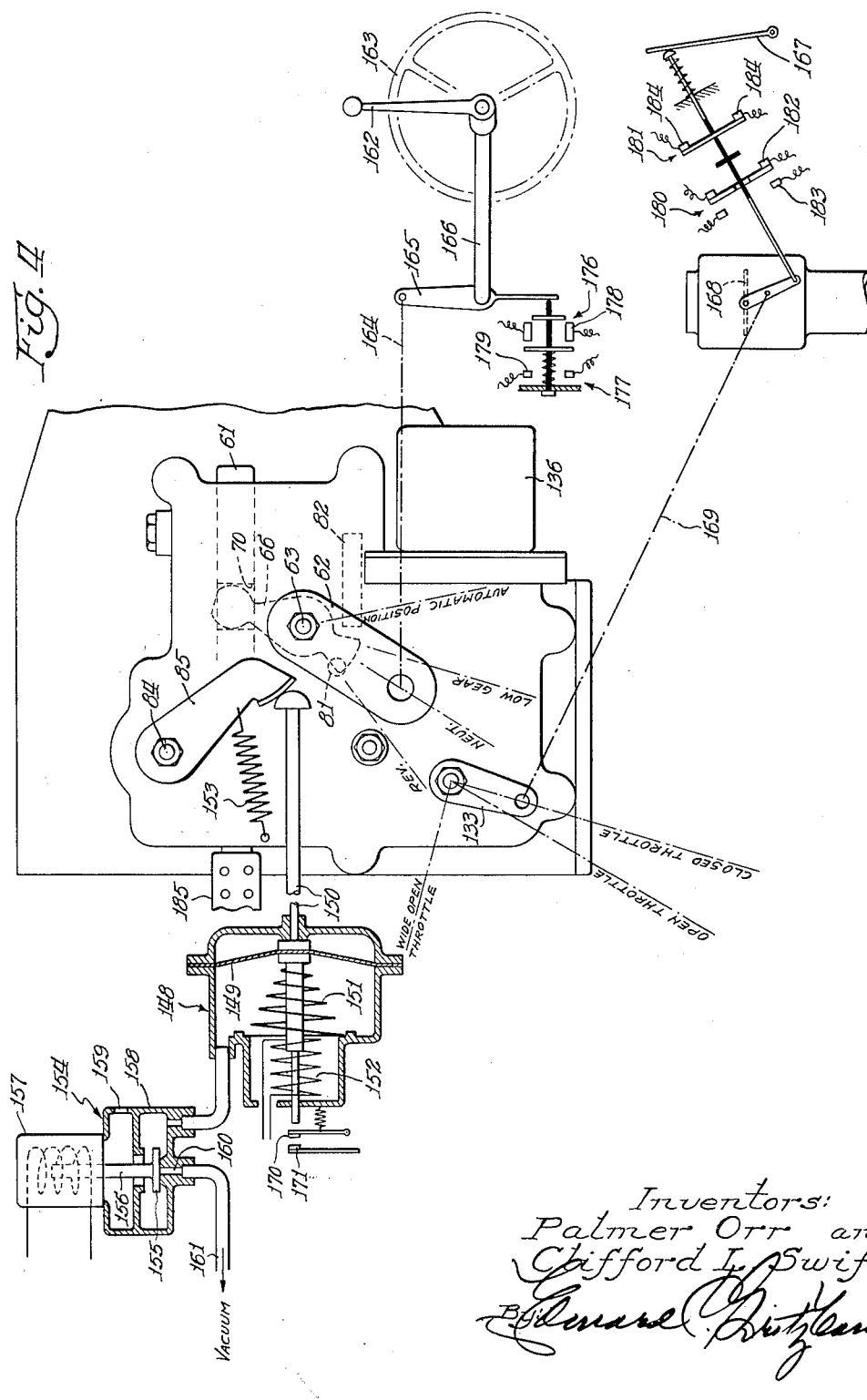

Inventors:
Palmer Orr and
Clifford L. Swift

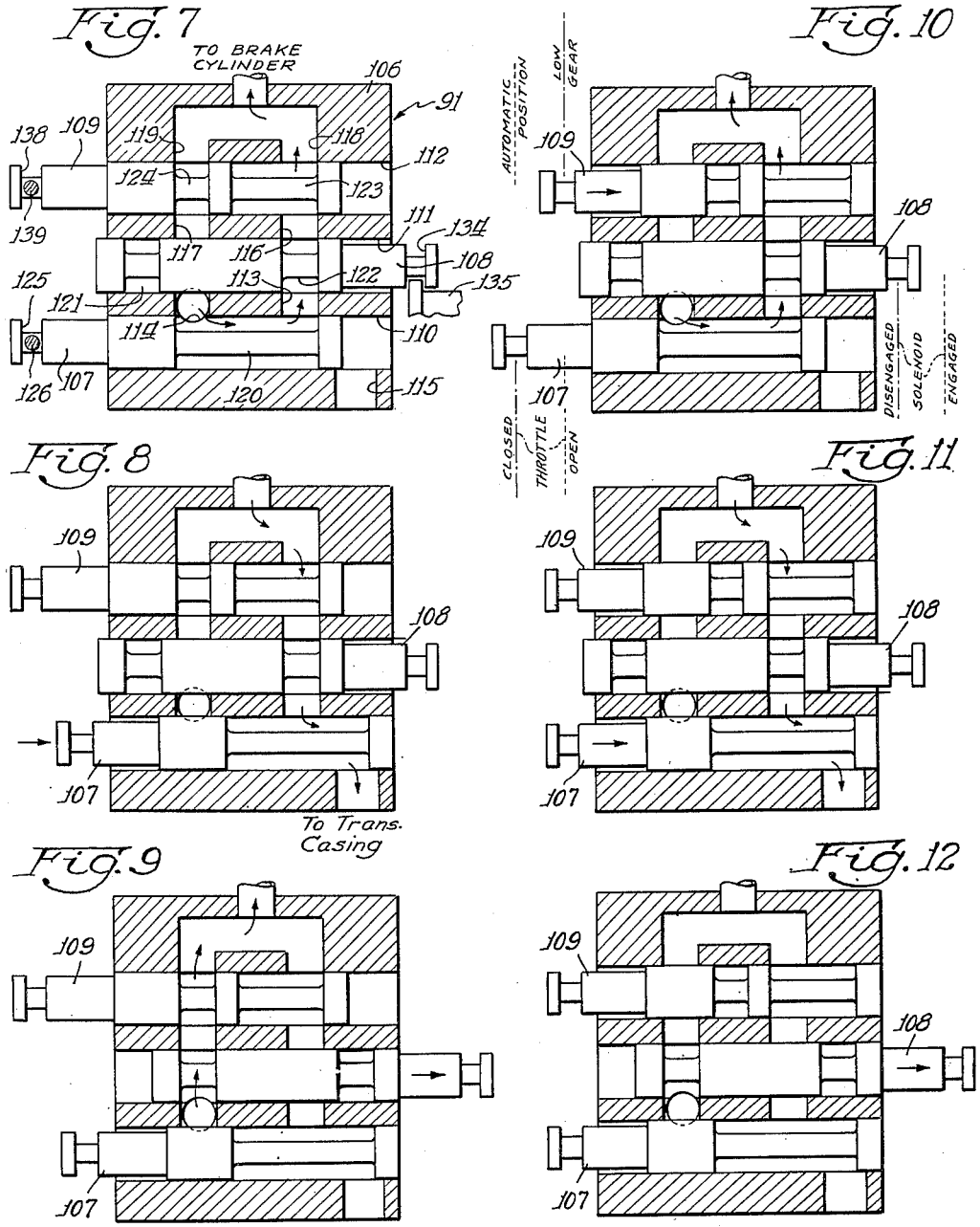

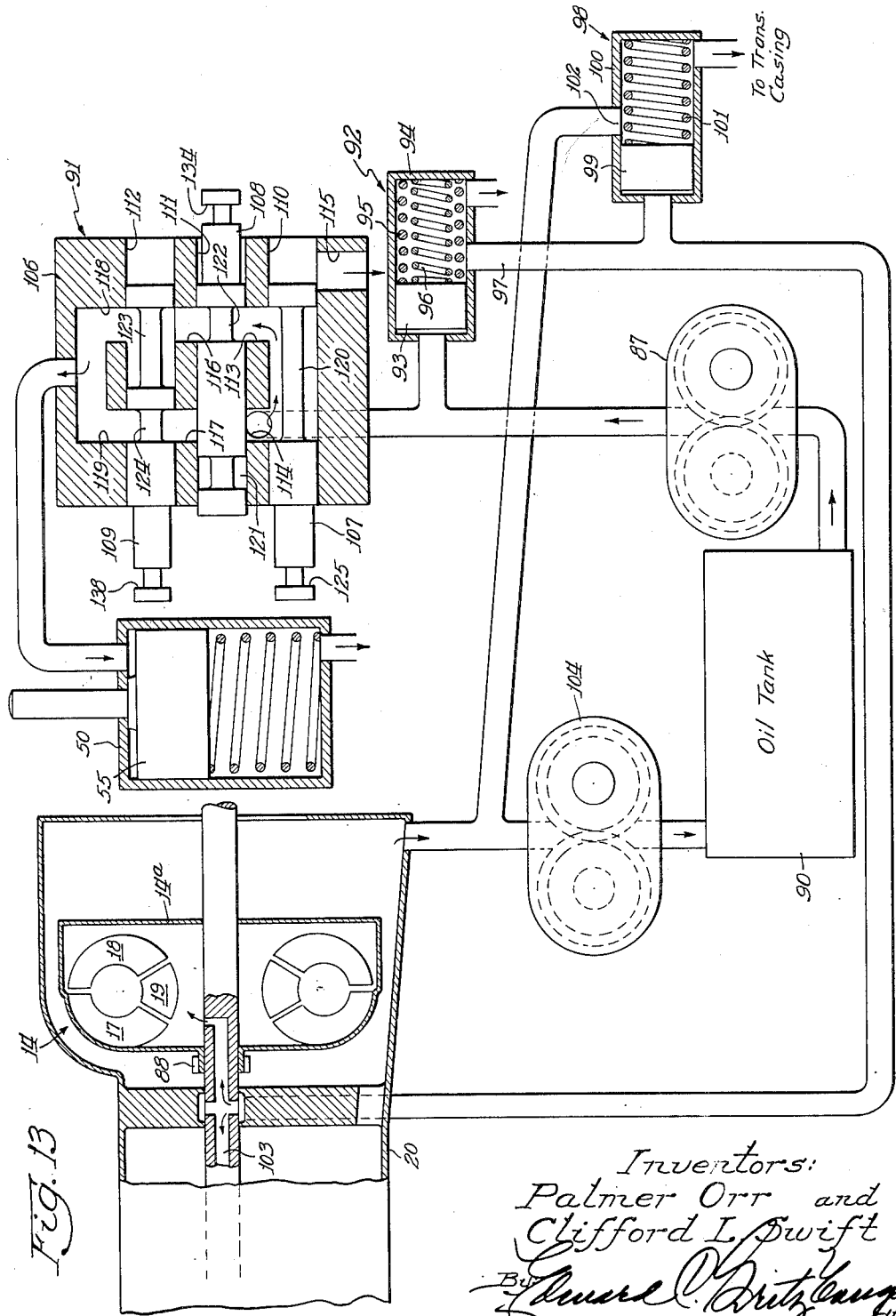

Patented Nov. 10, 1953

2,658,413

UNITED STATES PATENT OFFICE 2,658,413

TRANSMISSION

Palmer Orr and Clifford L. Swift, Muncie, Ind., assignors to Borg-Warner Corporation, Chicago, Ill., a corporation of Illinois Application December 22, 1947, Serial No. 793,098

16 Claims. (Cl. 74—645)

Our invention relates to transmissions particularly for automotive vehicles and more specifically to arrangements for controlling such transmissions.

It is an object of the present invention to provide an improved transmission controlling mechanism which is under the influence of the accelerator of the vehicle such that a power train is completed through the transmission when the accelerator is depressed from a closed throttle position toward an open throttle position. More particularly it is an object to provide such a transmission controlling mechanism adapted for use with a transmission having a hydrodynamic coupling device driven by the driving shaft of the transmission and which normally has a drag torque, and to this end it is an object to provide a friction engaging means so arranged that on engagement thereof it completes the power train through the transmission including the hydrodynamic coupling device, with the friction engaging means being under the control of the accelerator to be engaged when the accelerator is moved to an open throttle position.

It is another object of the invention to provide such a transmission controlling arrangement which includes a governor responsive to the speed of the driven shaft and which is so arranged that it causes the friction engaging means for completing the drive through the transmission as aforesaid to be released when the accelerator is moved to a closed throttle position and below a predetermined speed of the transmission driven shaft whereby below this speed the vehicle will run free of the engine and the hydraulic drag of the hydrodynamic device is not transmitted to the wheels of the vehicle.

It is a further object of the invention to provide such a friction engaging means as aforesaid which is engaged by spring pressure and is disengaged by hydraulic pressure so that when hydraulic pressure is not available as when the vehicle is stationary and the engine is inoperative, the transmission may nevertheless be put into gear.

It is also a further object of the invention to provide an improved hydraulic controlling system in such a transmission control arrangement for providing not only the necessary fluid under pressure for such controlling but also for supplying appropriate fluid pressure to the hydrodynamic coupling device.

The invention consists of the novel constructions, arrangements and devices to be hereinafter described and claimed for carrying out the above stated objects and such other objects as will appear from a detailed description of a preferred embodiment illustrated in the accompanying drawings wherein:

Fig. 1 is a longitudinal sectional view, partly schematic, of a transmission embodying the principles of the invention;

Fig. 1A is a fragmentary longitudinal sectional view on an enlarged scale of certain clutch structure illustrated in Fig. 1;

Fig. 2 is a sectional view taken on line 2—2 of Fig. 1;

Fig. 3 is a sectional view taken on line 3—3 of Fig. 1;

Fig. 4 is a partial side elevation of the transmission taken on line 4—4 of Fig. 2;

Figs. 7 to 12 are sectional views through valve mechanism of the transmission with the individual valves being shown in different positions;

Fig. 13 is a schematic illustration of the hydraulic system of the transmission control arrangement; and Fig. 14 is a schematic illustration of the electrical control system for the transmission control arrangement.

Like characters of reference designate like parts in the several views.

Figure 5:
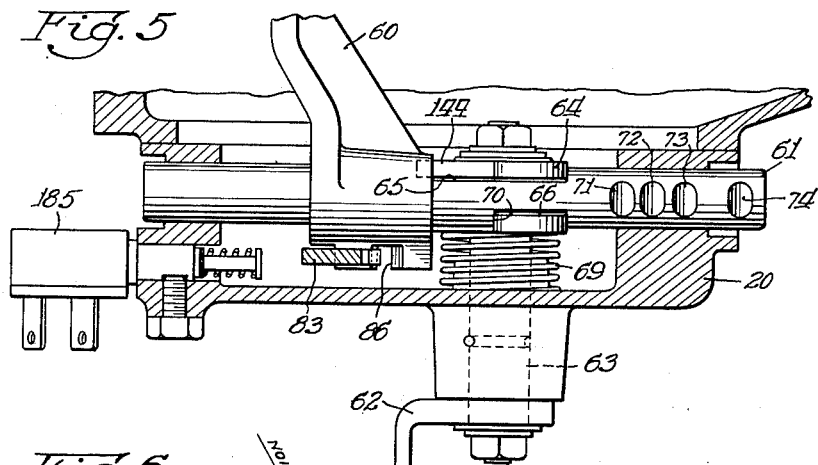
Fig. 5 is a partial sectional view of the transmission taken on line 5—5 of Fig. 2.

Referring now to the drawings, the illustrated transmission comprises an input shaft 10, an output shaft 11, an intermediate shaft 12 and a second intermediate shaft 13. The shaft 12 is driven by means of a hydrodynamic torque converter 14 which in turn is driven by planetary speed-up gearing 15 connected with the input shaft 10. The intermediate shaft 13 is splined within the shaft 12 as shown and is constructed to connect with elements of a planetary type gear set 16 which is connected to drive the output shaft 11.

The torque converter 14 is of an ordinary type and comprises an impeller 17, a runner 18 and a stator 19. All three of the elements 17, 18 and 19 are within a common casing in which there is a quantity of fluid such as oil with the arrangement being such that when the impeller 17 is rotated, the runner 18 is driven at an increased torque and the stator 19 functions as the reaction member of the torque converter. The stator 19 is coupled with the casing 20 of the transmission by means of a one-way brake 20a which functions to allow a free rotation of the stator 19 in the forward direction, that is, in the same direction as the direction of rotation of the shaft 10 but prevents its rotation in the reverse direction. The runner 18 is connected with the shaft 12 as shown and this shaft functions as the driven shaft of the torque converter.

The planetary gear set 15 comprises a ring gear 21, a sun gear 22, a set of planet gears 23 (one being shown in the drawing) in mesh with the ring gear and a set of planet gears 24 (one being shown in the drawing) in mesh both with the sun gear and with the planet gears 23. The ring gear 21 is connected with the input shaft 10; the sun gear 22 is connected with the shaft 12 and the planet gears 23 and 24 are disposed on a planet gear carrier 25 which is connected with the impeller 17 of the hydrodynamic coupling device. A one-way roller clutch 12a is provided between the intermediate shaft 12 and the input shaft 10, and this clutch is so constructed as to engage when the drive is such that the intermediate shaft tends to drive the input shaft in the forward direction, or in the same direction as these two shafts are driven by the engine of the vehicle.

The planetary gear set 15 functions to drive the carrier 25 and thereby the impeller 17 at a speed greater than that of the input shaft 10 when the shaft 12 driven by the converter is stationary. As the runner 18 and the shaft 12 increase in speed of rotation, the speeds of the carrier 25 and the impeller 17 decrease with respect to the speed of the shaft 10, and presently all of the parts of the planetary gear set 15 and the torque converter 14 rotate substantially at the same speed as the input shaft 10. The stator 19 is held stationary by the one-way brake 20a when torque is being multiplied through the converter 14, and the one-way brake allows the stator to rotate freely in the forward direction after the converter begins to function as a simple fluid coupling at which time there is no multiplication of torque. The one-way clutch 12a functions so that the shaft 12 may drive the shaft 10, as when the vehicle is coasting, so that the drive need not go through the torque converter 14 with the attendant slip.

This particular arrangement of torque converter and planetary speed-up gearing is shown only diagrammatically in view of the fact that the construction is well-known in the prior art being shown, for example, in Schneider Patent No. 2,333,681.

The planetary gear set 16 comprises a ring gear 26 which is fixed to the output shaft 11, a sun gear 27, a set of elongated planet gears 28 in mesh with the sun and ring gears (one gear 28 being shown in the drawing), a set of elongated planet gears 29 each of which is in mesh with one of the gears 28 (only one of the gears 29 being shown in the drawing), a sun gear 30 in mesh with the gears 29 and a carrier 31 for the planet gears 28 and 29. A brake drum 32 is connected with the carrier 31, and a friction brake 33 is provided for braking the drum and thereby the gear carrier.

The intermediate shaft 13 is splined within the shaft 12 as shown and has fixed thereto a control rod 34 which extends through a suitable slot 35 within the shaft 12. The rod 34 carries a collar member 36 provided with a channel 37 therein for receiving a suitable fork whereby the member 36, the rod 34 and thereby the shaft 13 may be shifted.

The shaft 12 is rotatably disposed within the transmission case by means of a ball bearing 38 and the output shaft is rotatably disposed within the case by means of a ball bearing 39. The shaft 13 is rotatably disposed within shaft 11 by means of a needle bearing 40; the carrier 31 is rotatably disposed on the shaft 11 by means of a bearing 41; and the carrier is rotatably disposed with respect to the intermediate shaft 12 by means of a bearing 42.

The intermediate shaft 13 is formed with external clutch teeth 43 and 44. The sun gear 27 is provided with internal clutch teeth 45 and the sun gear 30 is provided with internal clutch teeth 46. The carrier 31 is formed with internal clutch teeth 47, and a blocker type synchronizer ring 48 disposed within the carrier 31 as shown is provided with blocker teeth 49. As shown in Fig. 1A, the ring 48 is provided with lugs 48a which extends into slots 30a in the gear 30. The slots allow the ring a limited rotation with respect to the gear and at the limits of its movement, the blocking teeth 49 are out of line with the teeth 46 on the gear 30. A spring 48b is provided between the ring 48 and the gear 30 for holding the ring in engagement with the carrier 31. The copending application of Palmer Orr, Serial No. 793,097, filed December 22, 1947, now Patent 2,560,886, may be referred to for a more detailed description of the synchronizer ring 48 and associated parts, as well as for a description of the transmission so far described.

The shaft 13 is movable longitudinally with respect to the transmission casing 20 and with respect to the shafts 12 and 11. The clutch teeth 44 by movement of the shaft 13 to the rear mesh with the teeth 45, and the teeth 44 and 45 thus constitute a positive clutch for connecting the shaft 13 with the sun gear 27. The teeth 43 on the shaft 13 are adapted to mesh with the teeth 46, and the teeth 43 and 46 thus constitute a positive type clutch for connecting the sun gear 30 with the shaft 13. The teeth 43, when the shaft 13 is moved farther forwardly, are adapted to mesh also with the teeth 47 on the carrier 31, while at the same time remaining in mesh with the teeth 46. In this case, the shaft 13 is connected both with the sun gear 30 as well as with the carrier 31. The synchronizer ring 48, when the teeth 43 abut against the teeth 49 thereon, functions to synchronize the carrier with the shaft 13 and when synchronism is attained, the blocker synchronizer 48 rotates slightly with respect to the teeth 43 and allows the latter teeth to come into engagement with the teeth 47.

In the operation of the illustrated transmission, which is assumed to be installed in an automotive vehicle as the transmission is particularly adapted for use in such a vehicle, the input shaft 10 is driven by means of the engine (not shown) of the vehicle, and the output shaft 11 is connected with the road wheels of the vehicle and drive the same through the suitable connections (not shown). When the input shaft 10 is rotated, the impeller 17 of the torque converter 14 is driven at an increased speed with respect to the shaft 10 and applies torque on the runner 18 of the torque converter and thereby on the shaft 12. The shaft 13 together with its shift collar 36 are assumed to be in the positions in which they are shown, namely, in their neutral positions, with the teeth 43 and 44 being out of mesh with any of the other teeth in the transmission, and the friction brake 33 is released from the drum 32. The shaft 13 rotates freely within the gear set and there is no drive between the shaft 12 and the shaft 11.

The transmission is conditioned for low speed forward drive by engaging the teeth 43 with the teeth 46 by moving the shaft 13 forwardly of the transmission. The teeth 43 and 46 may be engaged with a minimum of clash due to the fact that the friction brake 33 is disengaged and it is necessary for the clutch teeth to pick up only the frictional and inertia loads of the parts in the gear set. With the teeth 43 and 46 engaged, the low speed forward drive train through the transmission may be completed gradually by a gradual engagement of the friction band 33. In this case the sun gear 30 is driven by means of the shafts 12 and 13 and the drive is through the planet gears 28 and 29 to the ring gear 26 and thereby to the output shaft 11. The planet gear carrier 31 is held stationary by means of the band 33, and the carrier 31 functions as the reaction member of the gear set.

In order to shift from low speed forward drive to high speed or direct drive in the gear set, the shaft 13 is shifted by means of its shift collar 36 forwardly to bring the teeth 43 into mesh also with the teeth 47 in addition to the teeth 46. With the teeth 43 being in mesh with both the teeth 46 and 47, the shaft 13 is coupled to both the carrier 31 as well as the sun gear 30. It will be understood that as this shift of the shaft 13 is made, the friction brake 33 is released. Coupling of both the sun gear 30 and carrier 31 to the shaft 13 causes a lock up of the parts of the gear set so that all of them rotate together and 1-1 drive results between the shafts 12 and 11. It will be understood that in both low speed forward drive and in direct drive through the gear set 16, the hydrodynamic coupling 17 transmits the torque as is required by the road wheels of the vehicle and the relation of the speeds between the impeller and drive shaft 10 varies in accordance with the load on the output shaft 11 in either of the speed ratios.

As has been described, the teeth 49 function to prevent a movement of the shaft 13 to bring its teeth 43 into engagement with the teeth 47 until there is a synchronization between the teeth 43 and 47. This synchronization is obtained by interrupting the drive between the shafts 10 and 11, as by decreasing the speed of the engine of the vehicle so as to allow synchronization in speed of the parts 13 and 31. The synchronizer ring 49 also functions to hasten this synchronizing so that the teeth 43 may move through the teeth 49 to engage with the teeth 47.

A drive in reverse may be obtained through the transmission by moving the shaft 13 rearwardly out of its neutral position in which it is shown to mesh the teeth 44 with the teeth 45. The engagement of these teeth is accomplished similarly to that of the teeth 43 and 46, namely, with the band 33 disengaged, and after the transmission has been conditioned for reverse by engagement of these teeth, the band 33 is engaged to complete the drive through the gear set and thereby through the transmission. The shaft 13 is driven from the shaft 12 and rotates the sun gear 27 in the forward direction. The band 33 functions to hold the carrier 31 stationary, and the ring gear 26 is thereby rotated in the reverse direction to give reverse drive through the transmission.

The transmission just described in detail is intended to be controlled automatically in accordance with actuation of the vehicle accelerator, and the transmission controls will now be described. The two parts of the transmission controlled are the brake band 33 and the shift collar 36. The brake band 33 is controlled by means of a fluid cylinder 50 fixed with respect to the casing 20 of the transmission and linkage mechanism 51 connecting the cylinder and brake band. The cylinder 50 contains springs 52, 53 and 54 acting between the end of the cylinder and a piston 55 within the cylinder. The piston is fixed on a piston rod 56. The linkage mechanism 51 comprises a lever 57 acting on a pin 58 which is pivotally mounted to one end 33a of the brake band 33. The connection between the lever 51 and pin 58 is eccentric with respect to the point of rotation of the link 57 so that when the link 57 is rotated in the counterclockwise direction as seen in Fig. 3, the pin 58 and the end 33a of the band 33 are moved upwardly to tighten the band. The other end 33b of the band 33 is fixed with respect to the transmission casing by means of an adjustable stud 59. It will be noted that the springs 52, 53 and 54 act on the piston 55 and rod 56 so as to hold the lever 57 in its band engaging position, and, as will be described, the band is disengaged by application of pressure to the piston 55.

The collar 36 is shifted by means of a fork 60 extending into the channel 37 of the collar and fixed on a shift rail 61 slidably mounted in the transmission casing 20. The shift rail 61 may be shifted by means of a shift lever 62 on the outside of the transmission swingably mounted by means of a shaft 63 extending through the transmission case. The shaft 63 has fixed to it on its inner end a lever 64 which is disposed and works in a slot 65 in the shift rail 61. A lever 66 is also disposed on the shaft 63 and is freely mounted on the shaft. The lever 66 is provided with two oppositely disposed cammed slots 67, and the lever 64 is provided with two face cams 68 which engage in the slots 67. The lever 66 is held against the cams 68 by means of a spring 69 disposed between the lever 66 and the casing 20, and the rail 61 has a slot 70 for receiving the lever 66.

The shift rail 61 has four positions, namely, for reverse, neutral, low speed forward and high speed forward ratios of the gear set, and for each of these ratios a slot is provided in the rail, the slots being designated respectively as 71, 72, 73 and 74. A poppet ball 75 is provided in a suitable opening in the transmission casing, and this ball is acted on by a spring 76. The ball is adapted to enter the slots 71, 72, 73 and 74 for yieldably holding the shift rail in any of its four positions.

The lever 64 is provided with a sector 77 and a poppet comprising a ball 78 and a spring 79 pressing on the ball acts on this sector. The spring and ball are disposed within a suitable cylindrical cavity formed in the transmission casing. The sector 77 is provided with a notch 80 for receiving the ball in one of the positions of the lever 64. The lever 66 is acted on by a pin 81 fixed within the transmission casing which functions as will be described to hold the lever from longitudinal movement along the shaft 63 due to action of the cams 68 until the shaft has rotated a predetermined amount. The lever 66 is also acted on by a pin 82 which functions to stop rotative movement after the lever 66 has moved a certain amount.

The shift rail 61 is adapted to be shifted also by a lever 83 which is fixed to a shaft 84 rotatably disposed in the transmission casing. The shaft 84 has fixed on its outer end a lever 85. The lever 83 is adapted to engage in a slot 86 in the shift fork 60 which is fixed to the shift rail 61.

The brake 33 by means of the brake-operating piston 55 is controlled by means of a fluid pressure system (see Fig. 13). This system comprises a fluid pressure pump 87 which is driven by the impeller 17 of the torque converter 14 by means of gears 88 and 89. The pressure pump is connected with an oil tank 90 and supplies fluid under pressure to a valve assembly 91. The pressure supplied by the pump 87 is kept at some predetermined value by means of an accumulator and high pressure relief valve 92. The relief valve 92 comprises a piston 93 movable in a cylinder 94 formed within the transmission casing. The piston is acted on by a pair of springs 95 and 96, and the cylinder is provided with a relief outlet 97 which is opened by the piston when it moves in the cylinder.

The relief outlet 97 is connected with a second relief valve 98 and also with the torque converter 14. The relief valve 98 comprises a piston 99 movable within a cylinder 100 against the action of a spring 101. The cylinder 100 has a relief opening 102 which is connected with parts hereinafter to be described. The connection of the relief opening 97 with the converter 14 is with the housing of the converter 14a (see the diagrammatic showing of the hydraulic system) in which the three elements 17, 18 and 19 are disposed and which holds the fluid for the three elements. The relief opening 97 is also connected with an internal passage 103 within the intermediate shaft 13 for lubricating the transmission.

The hydraulic system includes also a scavenger pump 104 which is driven by the gear 89 and also by a gear 105 in mesh with the gear 88. The pump 104 is connected with the transmission casing 20 for taking the fluid which leaks from the gear set and from the torque converter and putting it back into the system. The pump 104 discharges into the oil tank 90 as shown. The relief valve 98 functions to maintain the fluid pressure within the housing 14a of the torque converter and within the passage 103 of the gear set at a predetermined value and the discharge from this relief valve is to the inlet side of the scavenger pump 104.

The valve assembly 91 comprises a valve body 106 fixed with respect to the transmission casing 20 and three valves 107, 108 and 109 slidably disposed therein. These valves are slidably disposed respectively in cylinders 110, 111 and 112 formed in the valve casing 106. The cylinder 110 is connected by passages 113 and 114 with the cylinder 111 and is connected by means of the latter passage also with the accumulator or high pressure relief valve 92. The cylinder 110 also has a discharge opening 115. The cylinder 111 is connected by means of passages 116 and 117 with the cylinder 112, and the latter cylinder is connected by passages 118 and 119 with the brake cylinder 50.

The valve 107 is provided with an elongated groove 120; the valve 108 is provided with two spaced grooves 121 and 122 and the valve 109 is provided with an elongated groove 123 and a groove 124 which is shorter in length.

The three valves 107, 108 and 109 are connected with various mechanisms for moving the valves. The valve 107 is provided with a slot 125, and a pin 126 (see Fig. 6) carried by a lever 127 is disposed in the groove. The lever 127 is oscillatable with respect to the transmission casing, being carried by a shaft 128 fixed to the casing. The lever 127 is oscillated by means of a lever 129 which has a pin 130 entering into a slot 131 within the lever 127. The lever 129 is fixed on a shaft 132 rotatably mounted in the transmission casing, and a lever 133 (see Fig. 2) is fixed on the outer end of the shaft 132 for the purpose of operating the lever 129.

The valve 108 is provided with a slot 134, and an armature 135 (see Fig. 6) of an electric solenoid 136 fits within the slot 134 so that the valve and armature are connected for movement together. The solenoid 136 includes a spring 137 which acts to move the armature 135 to its outermost position with respect to the solenoid and thereby yieldably holds the valve 108 in a corresponding position.

The valve 109 is connected to be moved in accordance with movements of the lever 64 which shifts the shift rail 61. The valve 109 is provided with a groove 138, and a pin 139 carried by a lever 140 extends into the slot. The lever 140 is oscillatively mounted on a shaft 141 carried by the transmission casing, and this lever has a rod 142 connected therewith. The rod is slidably disposed with respect to the transmission casing 20 and is carried by two perforated lugs 143 formed on the casing. The rod 142 is in contact with a sector 144 formed on the shift lever 64, and this sector is formed with a slot 145 adapted to receive the end of the rod 142 when the lever 64 is moved to a predetermined rotative position. A spring 146 is provided between one of the lugs 143 and a collar 147 fixed on the shaft 142 for the purpose of holding the end of the rod 142 against the sector 144.

The lever 85 is operated by a vacuum motor 148. This motor includes a diaphragm 149 connected to a piston rod 150, and the end of the piston rod is adapted to abut against the end of the lever 85. A spring 151 is provided for acting on the piston rod for holding it normally in its outermost position, and when vacuum is applied to the vacuum motor, it pulls the rod 150 into the motor against the action of the spring 151. A holding coil 152 is provided within the motor for holding the piston rod 150 at its innermost position against the action of the spring 151, after vacuum has been utilized for drawing the piston rod into its innermost position. A spring 153 is provided between the transmission casing and the lever 85 for rotating the lever after the piston rod has been moved to its innermost position within the vacuum motor.

The vacuum motor is connected to an electrically operated vacuum valve 154. The valve includes a valve piston 155 connected with an armature 156 of an electro-magnet 157. The valve comprises a casing 158 having a port 159 open to atmosphere and a port 160 connected with a source of vacuum 161 which may be the manifold of an ordinary internal combustion engine used for driving the vehicle in which the transmission is installed. The electro-magnet when energized causes upward movement of the armature 156 and piston 155 to close the port 159 and open the port 160 and these ports are respectively opened and closed as will be apparent when the electro-magnet is deenergized.

The lever 62 is connected by any suitable linkage with a shift lever 162 located within easy reach of the driver of the automobile, such as immediately beneath the steering wheel 163 of the vehicle. This linkage may comprise a link 164 connected with the lever 62 on one end and with another lever 165 on the other end. The lever 165 is connected with the lever 162 by a shaft 166 so that rotative movement of the lever 162 causes similar rotative movement of the lever 165.

The lever 133 is adapted to be accelerator controlled and is connected with the accelerator 167 of the vehicle. The accelerator 167 functions in the usual manner for opening the throttle 168 of the vehicle and may be connected with the lever 133 in any suitable manner as by a link 169.

The electrical controls for the transmission comprise the holding coil 152 in the vacuum motor 148, the vacuum valve 154 having an electric solenoid 157 and the electric solenoid 136 hereinbefore described. The vacuum motor 148 includes an electric switch having contacts 170 and 171. The solenoid 136 includes an energizing winding 172 and a holding coil 173 and also includes a switch having contacts 174 and 175.

The electrical control system includes also steering column switches 176 and 177 which are closed for various positions of the levers 162 and 62. These switches include respectively contacts 178 and contacts 179. Two accelerator control switches 180 and 181 are also provided, and the switch 180 includes contacts 182 and 183 and the switch 181 includes contacts 184. A rail switch 185 is provided which includes contacts 186 and 187, and this switch is actuated by the rail 61 or more particularly by the shift lever 60 attached to this rail. The electrical circuit includes also a switch 188 operated by a governor 189 driven from the output shaft 11.

The electrical system includes a relay 190 comprising a winding 191 for causing movement when energized of an armature 192. Two sets of contacts 193 and 194 are closed upon movement of the armature 192 due to energization of the coil 191.

The electrical system is connected with the usual battery 195 and ignition switch 196 of the vehicle and is also connected with the ordinary ignition system of the vehicle 197 comprising the ignition coil having a primary winding 198 and a secondary winding 199 and an interrupter 200 for current through the primary winding.

As is shown, the switches 196, 176, 181, 188 and the contacts 182 of switch 180 are connected in a series circuit with the relay winding 191 and the battery 195. The contacts 193 of the relay 190 connect the switch 176 with the contacts 187 of the switch 185 and thereby with the ignition switch 196. The contacts 194 connect the switch 176 with the switch 177, the vacuum valve 154 and the winding 152 of the vacuum motor 148. The contacts 170 and 171 in the vacuum motor are connected with the contacts 183 of the switch 180 and thereby with the primary winding 198 of the ignition system. As will be noted the contacts 186 of the switch 185 are in parallel with the switch 181.

Figure 6:
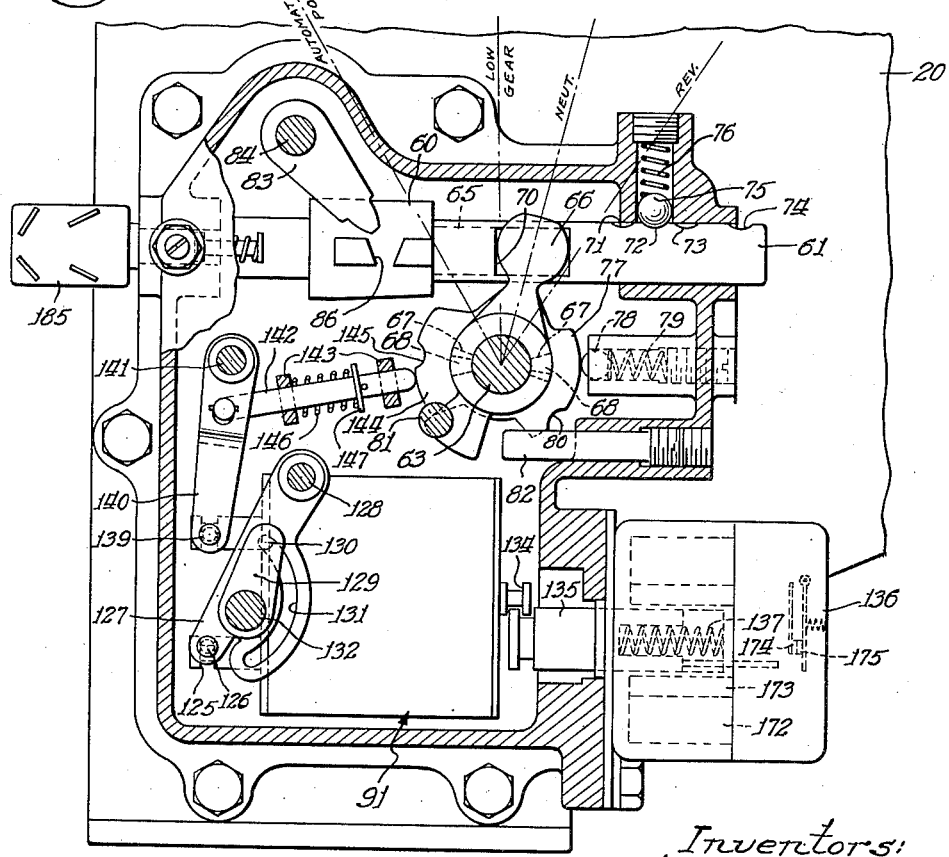
Fig. 6 is a sectional view taken on line 6—6 of Fig. 2.

As has been described, the transmission provides a low forward drive, a direct drive, a reverse drive and a neutral condition, all of the drives including the torque converter 14, and shifting between the various drives is accomplished by operating the shift collar 36 and the brake band 33. The shift collar 36 is actuated primarily by the lever 162 beneath the steering wheel 163 which lever actuates the shift lever 62 on the side of the transmission. The shift lever 62 and thereby the operator's shift lever 162 have four definite positions which correspond to reverse drive, neutral, low speed forward drive and automatic high drive, all of these positions being indicated in the drawings with respect to the lever 62. If the levers 162 and 62 are moved to their low speed positions, the levers 64 and 66 are thereby moved in the same manner as lever 62 since they are connected with this lever. Although the lever 66 is rotatably mounted on the shaft 63, it nevertheless moves with the lever 64 due to the fact that the pin 81 holds the lever 66 from axial movement along the shaft 63 which would be caused by the cams 68. The lever 66 fitting in the smaller slot 70 in the shift rail 61 thus functions to move the shift rail 61 to the left as seen in Fig. 6, so that the ball 75 moves into the slot 73. The shift fork 60 moves with the rail 61, and the shaft 13 is shifted to the left as seen in Fig. 1, to mesh the teeth 43 with the teeth 46 for conditioning the low speed power train for completion. The band 33 is disengaged and the teeth 43 may be meshed with the teeth 46 without difficulty since, if the parts are rotating at all, they need only be brought to the same speed against the forces of inertia of the parts. This engagement of the teeth 43 with the teeth 46 will result in the planet gear carrier 31 being driven in the reverse direction until the throttle 168 is opened.

With the transmission being conditioned for neutral, the vehicle stationary and the throttle closed, the valves are in the conditions in which they are shown in Fig. 7. Conditioning of the transmission for low speed forward drive as has just been described has the effect of moving the valve 109 from its position as illustrated in the former figure to the position in which it is illustrated in Fig. 10, and the latter figure illustrates the positions of the valves when the transmission is conditioned for low speed forward drive and before the accelerator 167 is depressed to open the throttle. The lever 64 is rotated by movement of the levers 62 and 162 when the transmission is conditioned for low speed forward drive, and movement of the lever 64 brings it to a position in which the link 142 enters the notch 145 in the sector 144 of this lever. The spring 146 is operative to move the link into the notch, and this movement of the link has the effect of rotating the lever 140 and thus moving the valve 109 into the position in which it is illustrated in Fig. 10 from its position in which it is illustrated in Fig. 7.

While the throttle remains in closed condition with the transmission being thus conditioned for low speed forward drive, the valves 107, 108 and 109 are in the conditions in which they are shown in Fig. 10. The passage 114, to which fluid under pressure is supplied as will be hereinafter described, is in communication with the brake cylinder 50 through the groove 120, the passage 113, the groove 122, the passage 116, the groove 123 and the passage 118, and fluid under pressure is thus applied to the piston 55 for the brake 33. The springs 52, 53 and 54 normally hold the brake engaged but when fluid under pressure is applied to this piston, the piston moves inwardly of the cylinder 50 and disengages the brake. Thus with the throttle in closed condition the brake 33 is held in disengaged condition.

Referring to the diagrammatic illustration of the fluid system in the transmission, fluid under pressure is supplied to the port 114 in the valve block 106 from the accumulator or high pressure relief valve 92, being supplied by the pressure pump 87 driven from the impeller 17. The pump is directly connected with the passage 114 and the pressure discharged by the pump is kept at a certain value due to the action of the relief valve 92, the piston 93 moving back within the cylinder 94 against the springs 95 and 96 to open the relief port 97 when the pressure discharged by the pump 87 increases above this value. The fluid discharged from the relief passage 97 goes to fill the hydrodynamic device 14 and also is connected to discharge into the passage 103 in the shaft 13 for lubricating the transmission. This pressure is kept at some predetermined lower value by means of the relief valve 98 having a piston 99 functioning similarly to the piston 93 to open a relief port 102 when the pressure of fluid applied to the turbine increases beyond the lower predetermined value. The fluid discharged through the orifice 102 is connected with the inlet side of the scavenger pump 104 which not only pumps this fluid back into the oil tank 90 but also functions to pump the fluid from the casing 20 into the oil tank 90. It will be noted, incidentally, that the inner ends of the cylinders 94 and 98 are vented to the transmission casing 20 so that any fluid leaking past the pistons 93 and 99 goes within the transmission casing where it is drawn off by means of the scavenger pump 104.

As the throttle is opened, with the transmission being conditioned for low speed forward drive, the positions of the valves are as shown in Fig. 11. The throttle valve 107 is moved from its closed throttle position to an open throttle position thereby taking the groove 120 out of communication with the fluid supply passage 114 and connecting the passage 113 with the discharge opening 115. The brake cylinder 50 is thus drained of fluid and the springs 52, 53 and 54 become operative to engage the brake 33 through the linkage comprising the lever 57 and the link 58. The low speed forward ratio through the transmission is thus completed.

The valve 107 is moved from its closed throttle position to an open throttle position by means of the lever 133 on the outside of the transmission actuated by the accelerator 167. When this lever is moved from its closed throttle position to an open throttle position which may be less than the wide open throttle position, the valve 107 is moved between its two positions just mentioned. Swinging movement of the lever 133 causes a corresponding rotation of the lever 129 carrying the pin 130, and this pin moves within the slot 131 in the lever 127 and swings lever 127 about its shaft 128. The lever 127 is connected by means of the pin 126 with the valve 107 and this moves the valve. The valve 107 is thus moved to engage the brake 33 when the accelerator 167 is moved out of its engine idling position in a throttle opening direction.

The shape of the slot 131 is such that the valve 107 is moved between its open and closed throttle positions with a small movement of the accelerator in a throttle opening direction, and for the remainder of the movement of the accelerator in the throttle opening direction, the pin 130 simply travels in the slot 131 without causing any movement of the lever 127. The valve 107 is returned to its closed throttle position by a release of the accelerator to its engine idling position, and in this position the valve 107 again applies fluid pressure to the brake motor 50 to disengage the brake 33. The drive through the transmission is thus broken, and the arrangement gives a free wheeling type of drive as is apparent.

The transmission is shifted from the low forward speed condition to automatic high condition in which the transmission may be automatically downshifted from direct drive to low forward speed drive by actuation of the accelerator as will be hereinafter described, by actuating the shift lever 162 and thereby the lever 62, moving the latter to its automatic high position. This movement of the lever 62 moves lever 64, since both levers 62 and 64 are fixed to the shaft 63, and due to the fact that the slot 65 is elongated, this movement of the lever 64 does not affect movement of the rail 61. The lever 66 at this time has moved to the stop pin 82 and therefore cannot move radially any farther but the hub of this lever has moved past the pin 81, and the cams 68 operate at this time to move the lever 66 out of engagement with the rail 61. The rail 61 thus remains in its low speed forward position with the ball 75 being in the notch 73. Movement of the lever 64 to its automatic high position, it will be noted, moves the pin 142 out of the notch 145 against the action of the spring 146. The pin 142 causes corresponding movement of the lever 140 and this moves the valve 109 into its automatic high position, which is the same position of the valve corresponding to neutral and reverse, such valve position being shown in Fig. 7.

With the throttle being closed at first and then opened, with the transmission being conditioned for automatic high, the valve 107 moves from its condition in which it is shown in Fig. 7 to its position in which it is shown in Fig. 8. In Fig. 7 in which the valve 107 is shown in its closed throttle position, the oil supply passage 114 is connected with the brake cylinder 50 for disengaging the brake, the movement of the valve 107 by means of the accelerator 167 to its open throttle position as shown in Fig. 8 causes the brake cylinder to be connected with the discharge passage 115 in the valve block 106 and the cylinder 50 is thus drained and the brake 33 is engaged. With the transmission being thus conditioned for automatic high, opening of the throttle thus causes a drive in low speed gear.

The drive in low gear forward continues until the driver wishes to go into high gear and at such time in order to make this shift he simply releases the accelerator 167 allowing it to come back to its closed throttle position and this shift will be made assuming that the critical speed of the governor 189 has been reached. Referring to the electric wiring diagram, it will be noted that the switches 176, 196, 181, 180 and 188 are in series. The switch 176 is actuated by the shift lever 165 and thereby by the driver's shift lever 162 so that this switch is closed whenever the shift lever 162 is moved to condition the transmission for forward drive, in either low speed forward lockup or for automatic high speed drive. The ignition switch 196, of course, is on whenever the engine of the vehicle is operative. The switch 181 is a closed throttle switch and is controlled by the accelerator 167 and is closed when the accelerator is in closed throttle position. The switch 180 is a kickdown switch and is in its condition as shown in the wiring diagram for all positions of the accelerator except when the accelerator is moved to a wide open throttle position, and the governor switch 188 is closed whenever the speed of the output shaft increases above a predetermined speed. When the vehicle speed and thereby the speed of the output shaft 11 reach predetermined values, the switch 188 closes and the relay 190 is energized by means of the series circuit just mentioned, assuming that the accelerator is moved to its closed throttle position for closing the switch 181. The contacts 193 and 194 in the relay are closed upon energization of the relay.

The switch 177, like the switch 176, is actuated by means of the lever 62 and thereby by means of the operator's control lever 162, and the switch 177 is so connected as to be closed when the levers 62 and 162 are shifted to condition the transmission for automatic high forward drive. Closure of the contacts 193 has the effect of energizing the solenoid 136 and thereby its windings 172 and 173. Energization of the solenoid has the effect of pulling the solenoid armature 135 inwardly against the action of the spring 137 and thereby moves the connected valve 108 to its position in which it is shown in Fig. 9. The contacts 174 and 175 are separated on the armature moving in this manner, since the switch 174—175 is actuated by the armature; however, the holding winding 173 remains energized and holds the armature 135 in its position within the solenoid 136. With the valve 108 in its solenoid energized position, the oil pressure supply passage 114 is connected by means of the groove 121, the passage 117, the groove 124 and the passage 119 with the brake cylinder 50 for disengaging the brake.

Closure of the contacts 194 in the relay 190 has the effect of energizing the winding 157 of the vacuum valve 154 and also of the holding winding 152 in the vacuum motor 148. When the winding 157 is energized, the valve 158 is changed from a condition in which atmospheric pressure is admitted to the vacuum motor 148 to a condition in which vacuum from the vacuum line 161 is applied to the diaphragm 149 in the vacuum motor 148. When vacuum is thus applied to the diaphragm 149, the plunger 150 of the motor 148 is drawn inside the motor and this allows the spring 153 to be operative to move the lever 85 clockwise as seen in Fig. 4. The lever 83 is connected by means of the shaft 84 with the lever 85, and therefore the lever 83 moves with the lever 85. As the lever 83 moves, it engages in the slot 86 in the shift fork 60 and moves the shift fork and thereby the rail 61 into their high speed positions, with the ball 75 being positioned in the notch 74. As the shift fork moves to the high speed position, the gear 43 slides through the blocking ring 48 and its blocking teeth 49, assuming that the accelerator is permitted to remain in its throttle closing position a sufficient time for the parts 43, 46 and 47 to synchronize. The clutch 43 being in engagement with the gear 30 and the carrier 31, the planetary gear set 46 is locked up and a direct drive results between the intermediate shaft 12 and the output shaft 11 has been described and the transmission is in direct drive.

The rail switch 185 is actuated by means of the rail 61 so that when the rail 61 moves into its high speed position with the ball 75 being in the notch 74, the switch 185 is actuated to close the contacts 187 and 186. Since the contacts 186 are closed, the relay 190 remains energized to keep the relay contacts 193 and 194 closed even though the accelerator 167 is moved from its closed throttle position to an open throttle position as would normally be done when an automobile is being driven. The transmission thus remains in high speed ratio after the shift has been made above the critical speed of the governor 189 when the accelerator is released temporarily to its closed throttle position. As will be noted, the accelerator operated valve 107 may be in either of its positions corresponding to closed throttle or open throttle and since the oil pressure does not proceed through this valve to the brake cylinder, the brake piston 55 remains energized to keep the brake in disengaged condition.

The transmission may be downshifted by moving the accelerator to its open throttle position so as to actuate the kickdown switch 180. When this switch is actuated, the circuit through the relay 190 is broken and the relay contacts 193 and 194 open. The solenoid 136 is thus deenergized and the valve 108 is moved back to its position in which the groove 122 is in communication with the passages 113 and 116. The positions of the valves 107, 108 and 109 may be then as shown in Fig. 8, and the brake cylinder 50 is drained through the passage 115 to engage the brake 32. Deenergization of the winding 157 of the vacuum valve 154 and of the holding coil 152, due to opening of the contacts 194, has the effect of permitting the spring 151 of the vacuum motor 148 to be effective to again move the piston rod 150 and the lever 85 back to their low speed positions against the action of the spring 153. The spring 151, however, cannot be effective to move these parts, together with the shift rail 61 and the shift collar 60, until the drive from the engine has been broken in some manner to relieve the thrust between the teeth 43 and the teeth 47, and this is done by grounding the ignition circuit for the engine of the vehicle. The contacts 170 and 171 in the vacuum motor 148 are closed when the lever 85 and the vacuum motor piston 150 are in their high speed positions, and these contacts are in series with the contacts 183 in the kickdown switch 180, and one of the contacts 183 is connected with the end of the ignition coil 198 between the coil and the interrupter 200. The contact 171 in the vacuum motor 148 is grounded as shown, and when the contacts 170 and 171 are closed and the contacts 183 are closed on a kickdown by means of the accelerator, the ignition coil 198 is grounded so that the engine stops firing, thus interrupting the power delivered by the engine. The spring 151 is then effective to move the vacuum motor piston rod 150 and the shift lever 85 and thereby the shift rail 61 back into their low speed forward drive positions.

As has been described, the governor 189 when it closes the governor switch 188 conditions the mechanism for an upshift by a release of the accelerator above a predetermined speed of the output shaft 11. When the transmission is conditioned for low speed lockup, the governor and its switch has the function of preventing disengagement of the brake band 33 when the accelerator is released to its throttle closing position so that the vehicle coasts against the engine. The movement of the accelerator controlled valve 107 in starting the vehicle in low lock-up condition of the operator's control lever 162 and the transmission control lever 62 are shown in Figs. 10 and 11. When the governor 189 reaches its critical speed, the governor switch 188 is closed, and assuming the switch 181 is closed at closed throttle position, the relay 190 will be energized, and thereby the solenoid 136 will be energized. Energization of the solenoid 136 has the function of moving the valve 108, such as is shown in Fig. 12, and therefore after the brake cylinder 50 has been once drained in driving in low speed forward, oil pressure cannot again be applied to the brake cylinder to release the brake, regardless of the position of the throttle valve 107, with the valves 108 and 109 remaining in the positions in which they are illustrated in this figure. The brake band 33 thus remains engaged and above the critical speed of the governor 189, the vehicle coasts against the engine.

The transmission is conditioned for reverse drive by moving the transmission control lever 62 into its position in which it is indicated for reverse by means of the operator's control lever 162. Movement of lever 62 causes corresponding movement of the lever 64, and this lever acting in its slot 65 in the shift rail 61 causes corresponding movement of the shift rail and the shift fork 60 to shift the shaft 13 to mesh its teeth 44 with the teeth 45 of the sun gear 27. The gear set 16 is thus conditioned for reverse. Both of the switches 176 and 177 which are controlled by the levers 162 and 62 are open when the transmission is conditioned for reverse. The electric circuits thus are not operative to actuate the vacuum motor 148 or the solenoid 136 or the vacuum valve 154, and the only valve of the valves 107, 108 and 109 that is moved is the accelerator controlled valve 107. The valve 109 is in the same position as for automatic high forward drive and the valve 107 is moved by the accelerator from its position shown in Fig. 7 in which fluid pressure is supplied to brake cylinder 50 to its position in which it is shown in Fig. 8 in which the brake cylinder is drained through passage 115 to engage the brake. As in forward speed drives below the critical governor speed, the brake is engaged when the accelerator is moved from its closed throttle position toward an open throttle position and is released when the accelerator is returned to its closed throttle position, thus giving a free-wheeling type of drive.

The transmission and control arrangement therefor hereinabove described advantageously provides a low speed power train completed by engagement of the brake 33 under the control of the accelerator of the vehicle. The brake 33 is engaged by the springs 52, 53, and 54, and the piston 55 acts against the springs to disengage the brake. The accelerator functions to energize the fluid motor 50 when the accelerator is returned to its closed throttle position, assuming that the speed of the driven shaft 11 is below the critical governor speed. The reverse drive power train is completed in a similar manner, and the transmission is conditioned for either forward or reverse drive by engagement of the clutch teeth 43 either with the teeth 46 or the teeth 45 of the sun gears 30 and 27, respectively. The same friction band 33 advantageously is utilized for either forward or reverse drive. When the transmission is conditioned for low speed lock-up, as when the lever 66 shown in Fig. 6 is put in this position, the governor functions in this case to prevent a free-wheeling type of drive above the critical governor speed. We provide an advantageous system of valves 107, 108 and 109 for accomplishing these functions under the control of the accelerator, the governor, and the selector 162, respectively. It will be noted that the shaft 13 is shifted into its low and reverse positions by manual effort through the action of the lever 62; however, a motor 148, under the control of the vehicle accelerator, is provided for shifting between the high and low speed conditions of the transmission.

We consider an important feature of this transmission the fact that the planetary brake band 33 is released when the accelerator is in closed throttle position below the critical governor speed. Thus, with these conditions existing, the car will free-wheel and when standing substantially still, the hydraulic drag of the converter 14 cannot cause the vehicle to creep. The hydraulic system further is such that this band 33 is released during the time when the shaft 13 is shifted into either its reverse or forward low speed position. The clutching teeth 43 thus need pick up only the frictional and inertia loads of the parts in the gear set 16 which happen to be revolving at the time, and the teeth do not pick up the full drag of the converter 14 under such circumstances. Due to the fact that the springs 52, 53 and 54 are used for applying the brake 33 while the motor 50 is utilized for disengaging the brake, the vehicle may be parked in gear by engaging the teeth 43 with either the teeth 46 or teeth 45 of the sun gears 30 and 27. Further, due to the fact that this band is applied by springs, the vehicle can be driven in low speed ratio even though the high-pressure system might fail from any cause. The relief valve 92 has the advantageous function of not only regulating the pressure of fluid discharged by the pump 87 and keeping it at a predetermined value, but this valve also functions as an accumulator for fluid under pressure so that when the valves 107, 108, and 109 are so controlled as to connect the pump 87 and fluid motor 50, the fluid under pressure discharged by the pump 87 is augmented by that contained in the relief valve 92 so as to give a quick disengagement of the friction brake 33. A smaller pump 87 may be utilized for this quick disengagement than would otherwise be required if no such accumulator were used.

We wish it to be understood that our invention is not to be limited to the specific arrangements and constructions shown and described, except only insofar as the claims may be so limited as it will be apparent to those skilled in the art that changes may be made without departing from the principles of the invention. In particular, we wish it to be understood that in construing the following claims, wherever we mention a friction engaging means or the like we mean to include by such expression not only a friction brake but also a friction clutch, a brake being understood to be an engaging means between a stationary part and a movable part and a clutch being understood to be an engaging means for coupling together two movable parts. We also wish it to be understood that where in the following claims we mention means for operating a brake or an engaging means, we intend to include by this expression not only means for disengaging such a brake or engaging means but also means for engaging such a brake or engaging means.

We claim:

1. In a transmission for an automobile vehicle, the combination of an accelerator for the vehicle, a drive shaft, a driven shaft, means for completing a power train between said shafts and including a gear set and a friction brake, spring means for engaging said brake, fluid pressure responsive means for disengaging said brake, a source of fluid pressure, a valve between said fluid pressure source and said fluid pressure responsive means, and linkage for connecting said valve and said accelerator and including a lever connected with said accelerator and a lever connected with said valve, said levers being connected by a pin and slot connection, said accelerator being operative through said linkage for moving said valve from one operative position connecting said fluid pressure source and said fluid pressure responsive means to another position disconnecting said source and means and draining the fluid pressure responsive means to engage said friction brake when the accelerator is moved from a closed throttle position toward an open throttle position.

2. In a transmission, the combination of a drive shaft, a driven shaft, means for completing a power train between said shafts and including a positive type clutch and a friction type engaging means which when both are engaged complete the power train,, spring means for engaging said engaging means, fluid pressure responsive means for disengaging said engaging means, a source of fluid pressure, and valve means between said fluid pressure source and said fluid pressure responsive means for selectively applying fluid pressure to the fluid pressure responsive means or for draining the latter means.

3. In a transmission, the combination of a drive shaft, a driven shaft, means for completing a power train between said shafts and including a positive type clutch, a gear set, and a friction brake for an element of said gear set, said power train completing means completing said power train when both the positive type clutch and the friction brake are engaged, spring means for applying said friction brake, fluid pressure responsive means for disengaging said friction brake, a source of fluid pressure, and a valve between said fluid pressure source and said fluid pressure responsive means for selectively applying fluid pressure to said fluid pressure responsive means or for draining the latter means of fluid.

4. In a transmission for an automotive vehicle, the combination of an accelerator for the vehicle, a drive shaft, a driven shaft, means for completing a power train between said shafts and including a friction engaging means, fluid pressure responsive means for operating said engaging means, a source of fluid pressure, a valve between said fluid pressure source and said fluid pressure responsive means and operatively connected with said accelerator whereby to complete engagement of said friction engaging means when said accelerator is moved from a closed throttle position to an open throttle position, a governor responsive to the speed of said driven shaft, and a second valve in series with said first valve and controlled by said governor whereby to block flow of fluid between said first valve and said fluid pressure responsive means when said accelerator is returned back to its said closed throttle position and said driven shaft speed is above a predetermined value.

5. In a transmission for an automotive vehicle, the combination of an accelerator for the vehicle, a drive shaft, a driven shaft, means for completing a power train between said shafts and including a gear set and a friction brake for an element of said gear set, spring means for applying said brake, fluid pressure responsive means for disengaging said brake, a source of fluid pressure, a valve between said fluid pressure source and said fluid pressure responsive means and connected with said accelerator, said valve being moved from a position connecting said fluid pressure source with said fluid pressure responsive means to a position draining the latter means when said accelerator is moved from a closed throttle position toward an open throttle position, a governor responsive to the speed of said driven shaft, a second valve between said first valve and said fluid pressure responsive means, and means connecting said governor and said second-named valve whereby to move said second-named valve from a position connecting said first valve and said fluid pressure responsive means to a position disconnecting said first valve and said fluid pressure responsive means when said accelerator is returned to its closed throttle position and the driven shaft speed is above a predetermined value.

6. In a transmission for an automotive vehicle, the combination of an accelerator for the vehicle, a drive shaft, a driven shaft, a gear set having neutral, low speed drive and high speed drive conditions, a shift member for changing the speed ratio of the gear set between its said conditions and having a position corresponding to each of said conditions, manual means operative on said member for shifting the member between its neutral and low speed drive positions, motor means for shifting said member between its low speed drive and its high speed drive positions, and means connecting said motor means and said accelerator whereby the accelerator on being released to a closed throttle position shifts said member to its high speed position from its low speed position and the accelerator on being moved to an open throttle position invariably causes shifting of said member from its high speed position to its low speed position.

7. In a transmission for an automotive vehicle, the combination of an accelerator for the vehicle, a drive shaft, a driven shaft, a gear set having a neutral, a low speed drive and a high speed drive condition, a member for changing the speed ratio of said gear set between its said conditions and having a position corresponding to each of said conditions, manual means for shifting said member between its neutral and its low speed drive positions, motor means for shifting said member between its low speed drive and its high speed drive positions, a governor responsive to the speed of said driven shaft, and means under the control of said accelerator and said governor for moving said shift member from its low speed drive to its high speed drive positions when the accelerator is released to a closed throttle position above a predetermined speed of said driven shaft, and means under the control of said accelerator for moving said shift member from its high speed position to its low speed position when the accelerator is moved to an open throttle position.

8. In a transmission for an automotive vehicle, the combination of an accelerator for the vehicle, a drive shaft, a driven shaft, a gear set having neutral, low speed drive and high speed drive conditions, a shift member for said gear set having positions corresponding to each of said conditions, manual means for shifting said member between its neutral and its low speed drive positions, a friction engaging means for completing said low speed drive when engaged after said shift member has been put into its low speed drive position, means under the control of said accelerator for engaging said friction engaging means to complete said low speed drive when the accelerator is moved from a closed throttle position toward an open throttle position, a governor responsive to the speed of said driven shaft, motor means for shifting said shift member between its low speed drive and high speed drive positions, means under the control of said accelerator and said governor for actuating said motor means whereby to shift said shift member from its low speed drive to its high speed drive positions when said accelerator is moved to a closed throttle position above a predetermined speed of said driven shaft, and means under the control of said accelerator for actuating said motor means whereby to shift said shift member from its high speed drive to its low speed drive positions when the accelerator is moved to an open throttle position.

9. In a transmission for an automotive vehicle, the combination of an accelerator for the vehicle, a drive shaft, a driven shaft, means for completing a low speed drive power train between said shafts, means for completing a high speed drive power train between said shafts, said low speed and said high speed means comprising a shift member having a position corresponding to neutral and each of said drives, said low speed means including also a friction engaging means which when engaged completes the low speed power train after said shift member has preliminarily been placed in its low speed position, manual means for shifting said shift member from its neutral to its low speed position, motor means for shifting said shift member from its low speed to its high speed position, means under the control of said accelerator for engaging said friction engaging means for completing the low speed power train when the accelerator is moved from a closed throttle position toward an open throttle position after said shift member has been shifted from its neutral to its low speed position, and means under the control of said accelerator for actuating said motor means to shift said shift member from its low speed to its high speed positions and to disengage said friction engaging means for shifting the transmission from low speed ratio to high speed ratio when the accelerator is returned to a closed throttle position.

10. In a transmission for an automotive vehicle the combination of an accelerator for the vehicle, a drive shaft, a driven shaft, means for completing a low speed drive between said shafts, means for completing a high speed drive between said shafts, a shift member for conditioning the transmission for its low speed drive and for changing the speed ratio of the transmission into its high speed drive and having a neutral position and a position corresponding to each of said drives, manual means for shifting said shift member from its neutral to its low speed position, said low speed drive means including a friction engaging means which when engaged completes the low speed drive after said shift member has been preliminarily moved to its low speed position, means under the control of said accelerator for engaging said friction engaging means when the accelerator is moved from a closed throttle position toward an open throttle position with said shift member being in its low speed position, a governor responsive to the speed of said driven shaft, motor means for shifting said shift member from its low speed drive position to its high speed drive position, and means under the control of said accelerator and said governor for actuating said motor means for shifting said shift member from its low speed drive to its high speed drive position and for disengaging said friction engaging means when said accelerator is returned to a closed throttle position and the driven shaft is rotating above a predetermined speed.

11. In a transmission for an automotive vehicle the combination of an accelerator for the vehicle, a drive shaft, a driven shaft, means for providing a low speed drive power train between said shafts, means for providing a high speed drive power train between said shafts, a shift member for conditioning the transmission for said low speed drive and for changing the speed ratio of the transmission into its high speed drive and having a neutral position and a position for each of said drives, a friction engaging means for completing said low speed drive after said shift member is placed in its low speed drive position to condition the transmission for such drive, a governor responsive to the speed of said driven shaft, manual means for shifting said shift member from its neutral position to its low speed position, means under the control of said accelerator for engaging said friction engaging means when the accelerator is moved from a closed throttle position to an open throttle position, and means under the control of said accelerator and said governor for shifting said shift member from its low speed position to its high speed position and for disengaging said friction engaging means when said accelerator is returned from an open throttle to its closed throttle position and the driven shaft speed is above a predetermined value.

12. In a transmission for an automotive vehicle the combination of an accelerator for the vehicle, a drive shaft, a driven shaft, means for providing a low speed drive between said shafts, means for providing a high speed drive between said shafts, a shift member for the transmission having a neutral position, a low speed drive position and a high speed drive position, means under the control of said accelerator for shifting said shift member from its low speed drive position to its high speed drive position when the accelerator is moved from an open throttle to a closed throttle position, means actuated by said shift member for preventing a return of said shift member to its low speed drive position when the accelerator is thereafter moved out of its said closed throttle position toward an open throttle position, and means for overruling said last-named means and being under the control of said accelerator for changing the speed ratio of the transmission to a lower speed drive and for moving said shift member from its high speed drive position to its low speed drive position when the accelerator is moved into a wide open throttle kickdown position.

13. In a transmission for an automotive vehicle the combination of an accelerator for the vehicle, a drive shaft, a driven shaft, means for providing a low speed drive between said shafts, means for providing a high speed drive between said shafts, a governor responsive to the speed of said driven shaft and having a switch which is closed at a predetermined speed of said driven shaft, a switch under the control of said accelerator and closed at a closed throttle position of the accelerator, a shift member for the transmission and having a low speed position and a high speed position, power means for shifting said shift member and being under the control of said switches whereby to shift the shift member from its low speed to its high speed position when the accelerator is moved to a closed throttle position and the driven shaft is rotating above a predetermined speed, a switch actuated by said shift member and in parallel with said accelerator switch whereby to overrule action of the accelerator switch when the shift rail is in high speed position, and another switch in series with said two first-named switches and adapted to overrule action of said third-named switch actuated by said shift member whereby to cause a shifting movement of said shift member from its high speed position to its low speed position when the accelerator is moved to a wide open throttle kickdown position.

14. In a transmission for an automotive vehicle, the combination of an accelerator for the vehicle, a drive shaft, a driven shaft, means for providing a low speed drive between said shafts, means for providing a high speed drive between said shafts, a selector for conditioning the transmission either for a drive only in low speed ratio or for a drive in either low speed ratio or high speed ratio, a friction engaging means for completing a drive through the transmission in low speed ratio, fluid pressure means for operating said friction engaging means, a source of fluid pressure, three valves between said fluid pressure source and said fluid pressure responsive means, and a governor responsive to the speed of said driven shaft, one of said valves being actuated by said accelerator, another of said valves being actuated by said governor and the third of said valves being actuated by said selector, said accelerator actuated valve functioning to complete engagement of said friction engaging means when the accelerator is moved from a closed throttle position toward an open throttle position when the governor actuated valve is in a position corresponding to a low speed of said driven shaft, said governor actuated valve maintaining said friction engaging means disengaged when the valve is in a position corresponding to a high speed of said driven shaft, and said selector operated valve cooperating with said governor actuated valve for maintaining the friction engaging means disengaged for a high speed of said driven shaft when the selector is set for its high speed ratio position and being ineffective for such maintenance of condition of said friction engaging means when in its position corresponding to low speed ratio setting of said selector.

15. In a transmission for an automotive vehicle, the combination of an accelerator for the vehicle, a drive shaft, a driven shaft, means for providing a low speed drive between said shafts, means for providing a high speed drive between said shafts, a shift member for conditioning the transmission for low speed drive or for changing the speed ratio of the transmission into high speed drive and having a neutral, a low speed drive and a high speed drive position, a selector effective for shifting the shift member between its neutral and its low speed drive positions, motor means for shifting the shift member between its low speed drive and its high speed drive positions, a friction engaging means for completing said low speed drive after said shift member is preliminarily put in its low speed drive position, a governor responsive to the speed of said driven shaft, fluid pressure responsive means for actuating said friction engaging means, a source of fluid pressure, and three valves between said fluid pressure source and said fluid pressure responsive means for said engaging means, one of said valves being actuated by said accelerator to be moved when the accelerator is moved out of a closed throttle position toward an open throttle position, another of said valves being responsive to said governor and to said accelerator and being moved from one position to another when the accelerator is in a closed throttle position and the driven shaft is above a predetermined speed, and the third of said valves being actuated by said selector to be moved when the selector is moved from a low speed lock-up position to an automatic high position, means under the control of said accelerator and said governor for shifting said shift member from its low speed position to its high speed position when the accelerator is moved to a closed throttle position and said driven shaft is rotating above a predetermined speed, said accelerator actuated valve functioning to engage said friction engaging means when the accelerator is moved from a closed throttle position toward an open throttle position when the driven shaft is rotating at a low speed, the governor actuated valve functioning to maintain said friction engaging means disengaged regardless of the movement of the accelerator when the selector actuated valve is set with the selector being in automatic high position, and the selector actuating valve functioning to prevent such maintenance of engagement of said friction engaging means when the valve is set by the selector when the latter is in its low speed drive position.

16. In a transmission, the combination of a drive shaft, a driven shaft, a hydrodynamic torque transmitting device and fluid pressure operated means for completing a drive through the torque transmitting device and between said shafts, a pump for supplying fluid under pressure to said fluid operated means, a relief valve for maintaining said fluid pressure applied to said fluid pressure operated means at a substantially constant value, said relief valve comprising a piston slidable in a cylinder and acted on by a spring, said cylinder having a discharge opening in its walls which is opened by said piston when the piston moves a distance against said spring, said discharge opening being connected with said hydrodynamic device for supplying fluid thereto, and a second relief valve similar to said first relief valve and including a piston movable against a spring within a cylinder and having a discharge opening, said last-named piston being effected by the pressure of fluid discharged from said first relief valve so that the second-named relief valve regulates the pressure within the hydrodynamic device, a fluid tank connected with the intake side of said pressure pump, and a scavenger pump connected with the casing of said transmission for drawing out of said casing any fluid leaking from said hydrodynamic device and discharging it into said fluid tank.

PALMER ORR.
CLIFFORD L. SWIFT.

References Cited in the file of this patent

UNITED STATES PATENTS

| Number | Name | Date |
|---|---|---|
| Re. 23,326 | Fleischel | Jan. 9, 1951 |
| 1,609,782 | Small et al. | Dec. 7, 1926 |
| 1,673,863 | Brown et al. | June 19, 1928 |
| 1,839,145 | Forichon | Dec. 29, 1931 |
| 2,008,231 | Vincent | July 16, 1935 |
| 2,009,477 | Clayton | July 30, 1935 |
| 2,068,579 | Tatter | Jan. 19, 1937 |
| 2,081,527 | Breese | May 25, 1937 |
| 2,152,089 | Price et al. | Mar. 28, 1939 |

(Other references on following page)

UNITED STATES PATENTS

| Number | Name | Date |
|---|---|---|
| 2,173,659 | Patterson | Sept. 19, 1939 |
| 2,210,239 | Hale | Aug. 6, 1940 |
| 2,221,393 | Carnegie | Nov. 12, 1940 |
| 2,227,412 | Stortz | Dec. 31, 1940 |
| 2,281,916 | Clayton | May 5, 1942 |
| 2,282,949 | Dolza | May 12, 1942 |
| 2,298,648 | Russell | Oct. 13, 1942 |
| 2,319,388 | Cotterman | May 18, 1943 |
| 2,332,593 | Nutt et al. | Oct. 26, 1943 |
| 2,343,955 | Cotterman | Mar. 14, 1944 |
| 2,368,684 | Simpson | Feb. 6, 1945 |
| 2,372,817 | Dodge | Apr. 3, 1945 |
| 2,374,303 | Osborne | Apr. 24, 1945 |
| 2,407,289 | LaBrie | Sept. 10, 1946 |
| 2,516,203 | Greenlee | July 25, 1950 |
| 2,541,391 | Weiss et al. | Feb. 13, 1951 |

FOREIGN PATENTS

| Number | Country | Date |
|---|---|---|
| 166,318 | Great Britain | July 1, 1921 |
| 347,788 | Great Britain | May 7, 1931 |
| 531,549 | France | Oct. 26, 1921 |